(No Model.) 2 Sheets—Sheet 1.

L. A. COOPER.
LAMP.

No. 482,994. Patented Sept. 20, 1892.

(No Model.) 2 Sheets—Sheet 2.

L. A. COOPER.
LAMP.

No. 482,994. Patented Sept. 20, 1892.

Witnesses:
J. W. Garfield
T. F. Deneen

Inventor,
Leslie A. Cooper
by Chapin & Co.
Attorneys

THE NORRIS PETERS CO., PHOTO-LITHO., WASHINGTON, D. C.

UNITED STATES PATENT OFFICE.

LESLIE A. COOPER, OF SPRINGFIELD, MASSACHUSETTS.

LAMP.

SPECIFICATION forming part of Letters Patent No. 482,994, dated September 20, 1892.

Application filed June 3, 1891. Serial No. 394,990. (No model.)

*To all whom it may concern:*

Be it known that I, LESLIE A. COOPER, a citizen of the United States, residing at Springfield, in the county of Hampden and State of Massachusetts, have invented new and useful Improvements in Lamps, of which the following is a specification.

This invention relates to improvements in lamps, and more generally to gas-lamps of the regenerative type, an example of which is illustrated in Letters Patent of the United States granted to Sidney Henry July 3, 1888, No. 385,669.

The primary object of the invention is to secure a stormproof casing for the lamp.

Further objects are to improve the conditions for combustion consequential upon which the deterioration of the lamp is lessened and to form a heat-guard for the gas-governor when the lamp is a gas-burning lamp, which governor is, for practical reasons, arranged in proximity to the burner, and which guard is of a construction to render the governor accessible.

The invention consists in features and arrangements or combinations of parts, all as will hereinafter more fully appear, and be set forth in the claims.

A lamp embodying structural features of improvement in accordance with this invention is illustrated in the accompanying drawings, in which—

Figure 1:
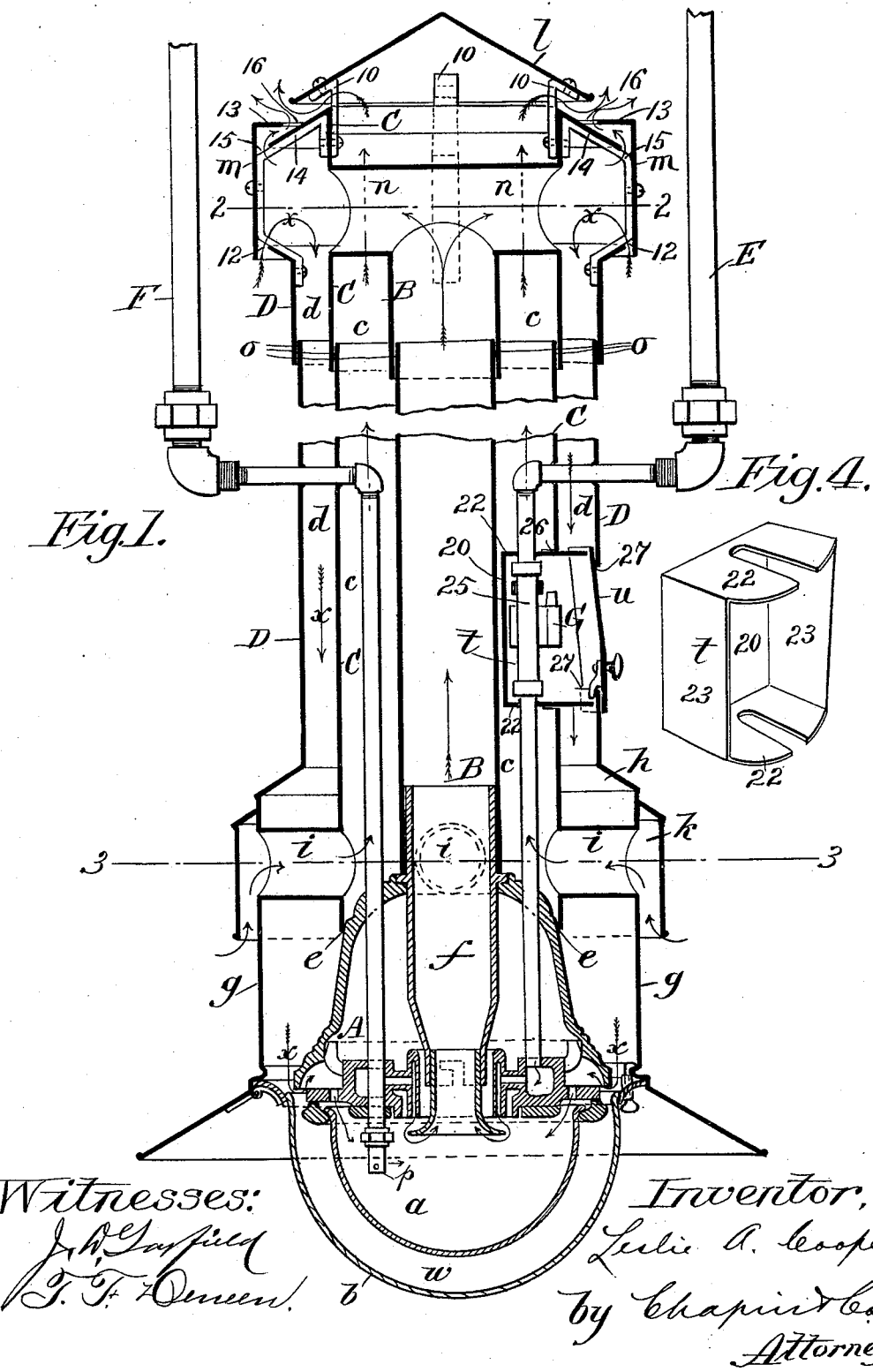
Figure 2:
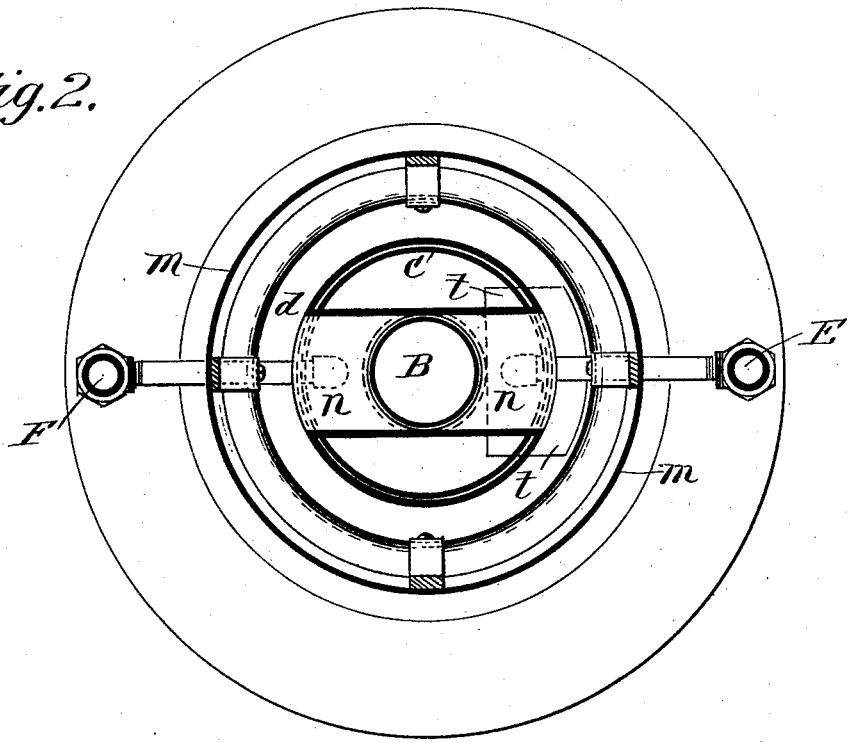
Figure 3:
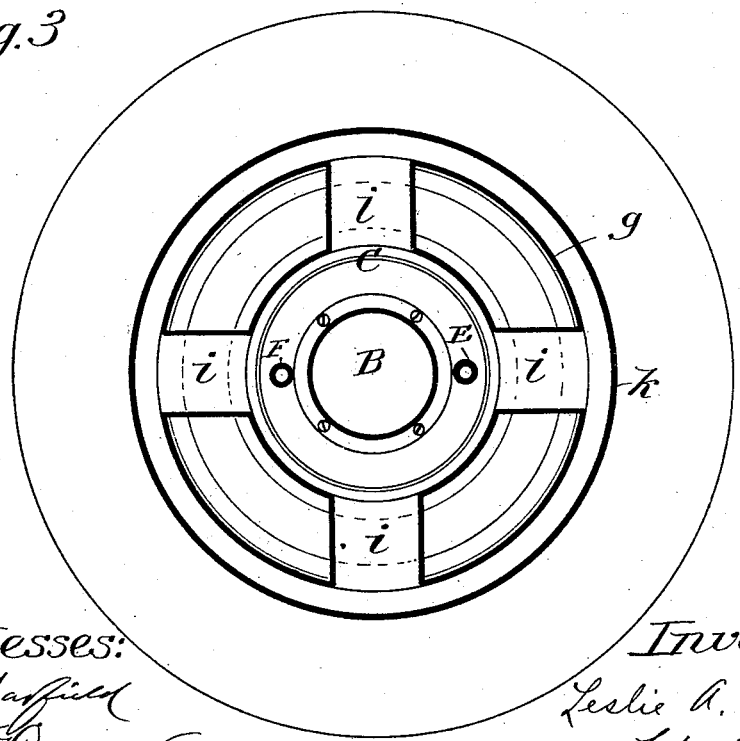

Figure 1 is a central vertical section, Figs. 2 and 3 being cross-sections, respectively, on the lines 2 2 and 3 3, Fig. 1. Fig. 4 is a perspective view of a detail of construction to be hereinafter referred to.

In the drawings, A represents the burner of the lamp which in many respects, resembles that illustrated in the said Henry patent, there being in the present lamp two globes $a$ and $b$, one inclosing and connected to the lower portion of the burner and the other outside and concentric therewith being suitably supported and constituting between it and the inner globe the space $w$, which comprises the outer portion of a hemisphere. The burner A, which is internally provided with annular gas and air passages and orifices, as is already known and usual in this form of gas-burner, is provided with the central upwardly-extended draft-tube B, which is so connected to the burner as to form a communication with the combustion-space within the inner globe $a$. A tube C concentrically surrounds the draft-tube B, the lower end $e$ thereof being extended downwardly to a close bearing upon the circular and more or less cylindrical body $f$ of the burner. Said burner-body $f$ is at its lower portion surrounded by the cylindrical shell $g$, of greater diameter, which above the burner is slightly contracted, as at $h$, and is thence upwardly extended in the tubular shell or section D, which surrounds and is separated from the intermediate tube-section C. The intermediate and annular space $c$, which is between the central draft-tube B and the surrounding tube C, and which space is practically closed at its lower end, as at $e$, leads upwardly and is open at its upper end, the said annular space $c$, however, having in communication therewith outwardly-extended radial flues $i\ i$, which extend through the said annular shell $g$, and the mouths of said flues $i\ i$ are hooded, as shown at $k$. The upper end of the said passage $c$ has provided therefor the hood $l$, which is held suitably separated from the upper end of the tube C by the bracket-lugs 10 10. The annular space $d$ between the intermediate tube C and the outer tube D is at its upper portion left open and in communication with the outer atmosphere, as indicated at 12, so that air may enter at the top and pass downwardly, as indicated by the arrows $x$, for supplying the burner with the air necessary for combustion in the usual way, and $m$ represents a shield constituted by the metallic band, as shown, which is inwardly flanged, as at 13, the said flange not being inwardly extended to contact with the annular and downwardly and outwardly deflected flange 14, formed on or secured to the upper end portion of the tube or shell which incloses the annular passage $c$, leaving the flue 16. The draft-tube B terminates at its top in the radial T or cross flues $n\ n$, which open to the outer annular space $d$ at the upper portion thereof and through the flue-opening 16 to the outer atmosphere.

For the purposes of economy and facility in the construction of the chambers, flues, and passages at the upper portion of the lamp, generally or substantially as shown, the tubes B, C, and D are formed in sections, as shown in Fig. 1, united by overlapping or slip joints, as indicated at $o$, said joint-forming portions for the respective tube-sections, as will of course be understood, fitting closely the one upon the other. The gas is supplied to the burner through the main gas-supply pipe E, which leads to the gas-space of the burner from the gas-supply, F representing a secondary pipe for admitting a limited gas-supply for the jet or pilot-light at p. By arranging the inlet-flue to the annular passage d and the exit-flue of the draft-tube in proximity to each other and providing a common storm guard or shield for both flues they are then subject to the same conditions and an equilibrium between the exhaust and supply may be maintained for the most even burning of the lamp.

The utility of the intermediate air-jacket consists in its effect to prevent the heating of the outer air-supplying flue or inlet-passage for the burner. The desirability of this will be understood, for it will be apparent that air entering passage d at the upper portion thereof, as indicated at 12, would fail to descend for effecting a proper combustion at the burner in the presence of intense heat in the passage d, which would be developed by radiation from the draft-tube B in the absence of the air-jacket. The air-jacket furthermore maintains the lamp at a reduced temperature, which is, however, by no means incompatible with the best combustion attainable, and thereby the destructive action of an undue heat upon the lamp is obviated.

G represents the gas-governor comprised in the gas-supply pipe E at a portion thereof which is near the burner and within the annular chamber c.

t represents a fender casing or guard which incloses the governor, the same consisting of the wall 20, upper and lower end walls 22 22, and vertical side walls 23 23. The said rear wall lies between the draft-tube B and the governor and the yoke or portion 25, to which the governor is connected. An aperture 26 is formed through the side of the intermediate tube C, and also another 27 through the other casing D, for the insertion and accommodation of the fender-casing, which latter is supported on the gas-pipe or otherwise.

u represents a door for closing the front portion of the fender-casing, which is adapted to slide to permit of easy access to the governor.

What I claim is—

1. A gas-lamp of the character substantially as described, having the burner and outer casing D, the central draft-tube in communication with the burner and the intermediate casing C, closed at its bottom, but open at its top, whereby are constituted the annular chambers or passages d and c, surrounding the draft-tube, there being an inlet-flue leading to the upper portion of chamber d for the entrance of air and passage thereof to the burner, flues i i, laterally leading from the outside of the lamp to the intermediate air-jacket chamber at the bottom thereof, and one or more flues n, leading laterally, for exit from the upper end of the central draft-tube, substantially as and for the purposes described.

2. In a gas-lamp of the character substantially as described, a burner A and inclosures therefor comprising the casing g, upwardly continued in the shell D, the shell C within the shell D, and the radial flues i i, provided with the hood k, the inner draft-tube in communication with the burner, having the radial flues n n, the outwardly-deflected flange 14 at the top of the tube C, the hood or band m, relatively arranged to constitute the inlet-flue 12 to the chamber d, and the exit-flue 16 for the products of combustion passing from the draft-flue, and the hood l, supported above the upper end of the tube C, substantially as described.

3. In a gas-lamp, in combination, the burner and inclosures therefor comprising the casing g, continued in the shell D, the shell C, concentrically within the shell D, and the inner draft-tube in communication with the burner and its upper end terminating in the radial flues n n, which pass through the casing C, radial flues i i, leading from the exterior of the casing g through the lower portion of the casing C and the hood k, the downwardly and outwardly deflected flange 14 at the top of the casing C, the band m, supported to surround said flange, separated therefrom and also from the upper end portion of the shell D to form in conjunction therewith the flues 12 and 16, and the hood l, and the said tubes D C and draft-tube B being formed in sections and jointed, all substantially as described.

4. A gas-lamp of the character substantially as described, having a burner, a central draft-tube, the outer annular passage or chamber for supplying air to the burner for combustion, and an intermediate annular air jacket or chamber between the draft-tube and the outer annular chamber, with an inlet-flue and an outlet-flue therefor, the gas-supply pipe passing into and downwardly through the intermediate air-chamber to the burner and provided with the gas-governor, and a fender-guard interposed between the governor and the draft-tube, substantially as described, and for the purpose set forth.

5. In a lamp, a burner at the bottom, a draft-tube leading upwardly therefrom, an annular passage or chamber surrounding the draft-tube and having at its top an inlet-opening and at its lower portion a communication with the burner and draft-tube, and an outlet-flue leading laterally from the upper portion of the draft-tube, which terminates in proximity to the said inlet-flue of the outer annular passage, and a common shield or storm-guard inclosing both of said flues, substantially as and for the purposes set forth.

LESLIE A. COOPER.

Witnesses:
WM. S. BELLOWS,
T. F. DENEEN.